United States Patent [19]

Pohlemann et al.

[11] 4,156,765

[45] May 29, 1979

[54] OPTICALLY ACTIVE POLYMERS CONTAINING METHYLPINANE GROUPS

[75] Inventors: Heinz Pohlemann, Limburgerhof; Horst Koenig, Ludwigshafen; Hardo Siegel, Speyer; Herbert Naarmann, Wattenheim, all of Fed. Rep. of Germany

[73] Assignee: BASF Aktiengesellschaft, Fed. Rep. of Germany

[21] Appl. No.: 881,747

[22] Filed: Feb. 27, 1978

[30] Foreign Application Priority Data

Mar. 14, 1977 [DE] Fed. Rep. of Germany ....... 2711003

[51] Int. Cl.$^2$ .................... C08F 236/00; C08F 36/00; C08F 4/04

[52] U.S. Cl. ................ 526/282; 260/33.6 UA; 526/218

[58] Field of Search ........................ 526/282

[56] References Cited

U.S. PATENT DOCUMENTS 3,189,585   6/1965   Shearer ...................... 526/282

Primary Examiner—Herbert J. Lilling
Attorney, Agent, or Firm—Keil & Witherspoon

[57] ABSTRACT

New polymers with K values of from 20 to 140, in which the side chains contain optically active 1,6,6-trimethylnorpinanyl-2-methyl or 3-pinanyl-methyl groups, so that the polymers are also optically active. The polymers are used for the production of coatings and adhesives, as optical modifiers for films, and for finishing paper and textiles.

8 Claims, No Drawings

OPTICALLY ACTIVE POLYMERS CONTAINING METHYLPINANE GROUPS

The present invention relates to new polymers and to a process for their manufacture.

It is an object of the present invention to provide polymers which contain optically active groups and which are also stable to hydrolysis.

We have found that this object is achieved by providing polymers with K values of from 20 to 140, which polymers contain structural units of the general formula

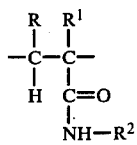

where R is H, COOH or CO—NH—$R^2$, $R^1$ is H or $CH_3$ and $R^2$ is

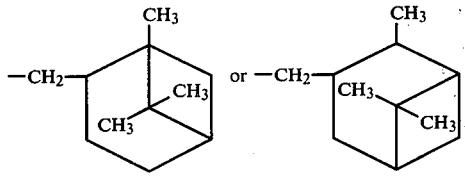

These polymers are macromolecular compounds in which the side chains contain optically active 1,6,6-trimethylnorpinanyl-2-methyl or 3-pinanyl-methyl groups, and which accordingly are also optically active.

It is a further object of the present invention to provide a method of manufacturing such polymers.

We have found that this object is achieved by polymerizing unsaturated compounds of the general formula

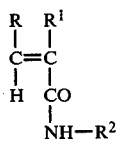

where R is H, COOH or CO—NH—$R^2$, $R^1$ is H or methyl and $R^2$ is

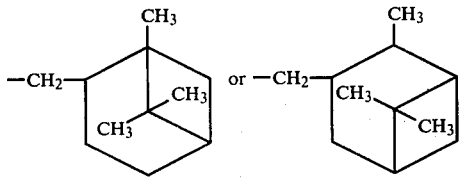

with or without other olefinically unsaturated compounds.

Polymers with K values of from 20 to 140, which contain structural units of the general formula

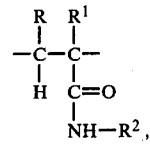

where R, $R^1$ and $R^2$ have the above meanings, are macromolecular compounds which consist entirely or substantially or partially of recurring units of the formula

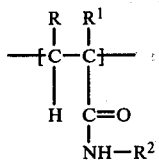

where the portion

of the formula is part of a polymer chain. Accordingly, the general formula embraces both homopolymers, i.e. polymers which contain only the above structural units, and copolymers with compounds which are copolymerizable with the corresponding olefinically unsaturated compound

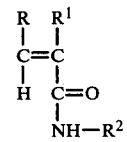

The K value of the polymer means the technical parameter which is conventionally used to characterize the degree of polymerization of a polymer. The K value of the polymers of the invention was measured by the method of H. Fikentscher, Cellulosechemie 13 (1932) 58-64 and 71-74, in 5 percent strength aqueous sodium chloride solution at 25° C.; $K = k \cdot 10^3$.

The substituent $R^2$ in the side chain of the polymers is either 1,6,6-trimethylnorpinanyl-2-methyl (i.e. 1,6,6-trimethyl-bicyclo[3,1,1]-heptanyl-2-methyl) or 3-pinanylmethyl (i.e. 2,6,6-trimethylbicyclo-[3,1,1]-heptane-3-methyl). These radicals may each be in the optically active l (−) or d (+) form. Optical activity means the physical phenomenon whereby the solution of an optically active substance rotates the plane of linearly polarized light through a certain angle to the right (+) or to the left (−). Solutions of the polymers claimed may be dextro-rotatory, levo-rotatory or non-rotatory (d, L), depending on whether the substituent $R^2$ is in the levo-rotatory form, the dextro-rotatory form or the racemate form (d, L). These effects are disclosed in the relevant literature and do not require further description here.

The new polymers may be manufactured by polymerizing the olefinically unsaturated compounds, containing 1,6,6-trimethylnorpinanyl-2-methyl or 3-pinanyl-methyl groups, of the general formula

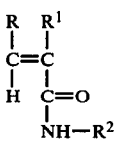

where R is H, COOH or CO—NH—R², R¹ is H or CH₃ and R² is

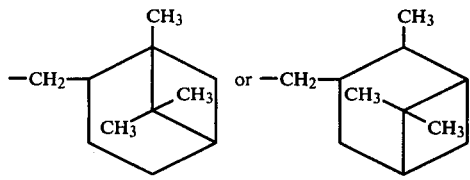

or copolymerizing the above compounds with copolymerizable compounds. Particularly suitable olefinically unsaturated monomers containing methylpinane groups are compounds I to VIII.

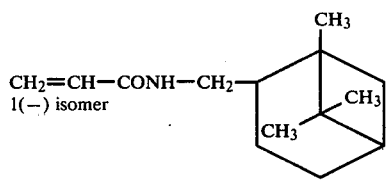   I as I above  II
d(+) isomer

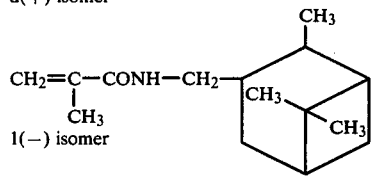   III as III above  IV
d(+) isomer

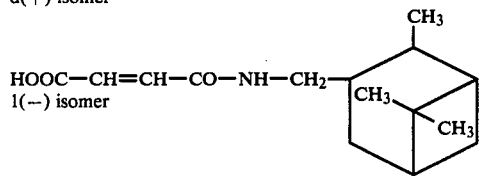   V as V above  VI
d(+) isomer

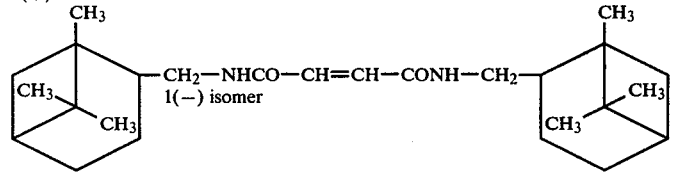   VII as VII above  VIII
d(+) isomer

Corresponding compounds containing 1,6,6-trimethylnorpinanyl-2-methyl groups may also be used.

Such olefinically unsaturated monomers containing methylpinane groups are manufactured by, for example, reacting the corresponding unsaturated acid chlorides or maleic anhydride with the corresponding optically active aminomethylpinanes.

The monomers of the formulae I to IV can each be homopolymerized. Of course, mixtures of different compounds from this group may also be copolymerized. Furthermore, the compounds can be copolymerized with other olefinically unsaturated monomers. However, the monomers of the formulae V to VIII cannot be homopolymerized but can only be copolymerized. Particularly suitable comonomers for these derivatives are styrene and alkyl acrylates.

Examples of suitable olefinically unsaturated monomers which may be copolymerized with the above optically active amides of the formulae I to VIII are olefins, e.g. ethylene, propylene, butadiene, isoprene, styrene and substituted styrenes, e.g. α-methylstyrene, p-chlorostyrene and p-methylstyrene, acrylic acid esters and methacrylic acid esters, especially with alcohols of 1 to 18 carbon atoms, preferably of 1 to 8 carbon atoms, e.g. methyl, ethyl, butyl or ethylcyclohexyl acrylate or methacrylate; monoesters of ethylene glycol, 1,2-propylene glycol, 1,3-butylene glycol and 1,4-butylene glycol, acrylamide, methacrylamide and substituted amides, e.g. N-methylolacrylamide and their ethers, e.g. N-methylolacrylamide butyl ether and N-methylolmethacrylamide methyl ether, acrylonitrile and methacrylonitrile, vinyl esters, e.g. vinyl acetate and vinyl propionate, vinyl ethers, e.g. methyl vinyl ether, ethyl vinyl ether and alkyl vinyl ethers where alkyl is of 3 to 6 carbon atoms, fumaric acid, maleic acid and itaconic acid, esters of these acids, and maleic anhydride. It is also possible simultaneously to copolymerize two or more of the above compounds with the above optically active acrylamidopinanes. Difunctional crosslinking agents, e.g. divinylbenzene, may also be used, in amounts of from 0 to 3 percent by weight.

For the manufacture of copolymers, the proportion of the olefinically unsaturated monomers according to the invention, of the formula I to IV, in the monomer mixture can vary within wide limits, and can be, for example, from 1 to 99, especially from 5 to 80, and preferably from 8 to 60, percent by weight, based on the total weight of the monomers; on the other hand, the compounds of the formulae V to VIII are only copolymerized with the monomers stated to be preferred, in the ratio of 1:1.

Conventional initiators which form free radicals are used to initiate the polymerization. Examples of suitable initiators are hydrogen peroxide, organic hydroperoxides and peroxides, e.g. caproyl peroxide, lauroyl peroxide, tert.-butyl perbenzoate, dicumyl peroxide, p-menthane hydroperoxide, cumene hydroperoxide and succinic acid peroxide, and aliphatic azo compounds which decompose into free radicals under polymerization conditions, e.g. 2,2'-azobis-2,4-dimethylvaleronitrile, 2,2'-azo-bis-isobutyronitrile and similar azonitriles, listed, for example, in J. Hine "Reaktivitat und Mechanismus in der organischen Chemie", published by Georg Thieme, Stuttgart (1960), page 412, as well as conventional redox catalyst systems, e.g. the systems comprising potassium persulfate or ammonium persulfate with ascorbic acid, sodium bisulfite or iron-II salts.

The transition metal chelates known to form free radicals, e.g. chelates of manganese-(III), cobalt-(III), copper-(II) and cerium-(IV), are also suitable. In general, 1,3-dicarbonyl compounds are used as chelating agents. Examples of chelates are manganese-(III) acetylacetonate and cobalt-(III) acetoacetate. The polymerization can also be initiated by radiation, in the presence or absence of sensitizers, e.g. benzoin derivatives.

The initiators are in general used in an amount of from 0.05 to 5 percent by weight, preferably from 0.1 to 1.0 percent by weight, based on the amount of monomer. The optimum amount, and the initiator of optimum activity, can readily be established experimentally.

The polymerization may be carried out as a mass polymerization. Preferably, however, it is carried out in the presence of solvents or diluents. Examples of these are ketones, e.g. methyl ethyl ketone and methyl propyl ketone, ethers, e.g. diethyl ether, tetrahydrofuran or dioxane, and aliphatic, cycloaliphatic and aromatic hydrocarbons, e.g. hexane, heptane, cyclohexane, benzene and toluene; dimethylformamide is also very suitable.

The suspension or solution polymerization processes conventionally used for many other monomers or monomer mixtures may also be used for the new process. The new process also does not differ from conventional processes in respect of the assistants which may be used, e.g. dispersants, protective colloids and the like.

The polymerization can be carried out over a wide temperature range, e.g. at from 0° to 150° C., preferably from 50° to 120° C., with reaction times of from 1 to 20 hours, preferably from 2 to 10 hours. In general, the polymerization is carried out under atmospheric pressure, but superatmospheric pressure may also be used. The use of the latter is particularly indicated in the case of copolymerizations with low-boiling comonomers, in order to achieve a sufficient concentration of the comonomer in the reaction mixture.

The copolymerization of the olefinically unsaturated compounds with ethylene or butadiene is advantageously carried out in aliphatics or aromatics, by introducing the copolymerizable monomers into the solvent, which contains an initiator, and polymerizing under superatmospheric pressure, in the case of ethylene as the comonomer at pressures of up to about 2,000 atmospheres.

The copolymerization with acrylic acid esters is advantageously carried out in aromatic or aliphatic hydrocarbons, under the conventional conditions for the polymerization of acrylic acid esters.

The polymers of the invention, which have K values of from 20 to 140, preferably from 50 to 90, can easily be methylolated because they contain amide groups. They are used, for example, for the manufacture of moldings, impact-resistant compositions, coatings and adhesives, and may or may not be employed as mixtures with other plastics, e.g. with polyethylene, polypropylene or vinyl acetate/ethylene copolymers. Because of their surface-active properties, the polymers may inter alia be used for finishing paper and textiles.

Since the polymers according to the invention contain optically active groups, they may also be used as optical modifiers for films.

Copolymers of the olefinically unsaturated optically active amides with acrylic acid esters are also of particular industrial interest. These products are soluble, e.g. in dimethylformamide or N-methylpyrrolidone, have a high molecular weight, are miscible with pigments and can be crosslinked with conventional crosslinking agents at relatively low temperatures. Such polymers are exceptionally suitable for use as antistatic agents.

In the Examples, parts and percentages are by weight. Where no other solvent is mentioned, the K values were determined on 1 percent strength solutions in dimethylformamide, using the method of H. Fikentscher, Cellulosechemie 13 (1932), 58.

EXAMPLE 1

Ethyl acrylate and compound I ($[\alpha]_D^{20} = -38.46°$) are mixed in various ratios; 0.1 percent by weight of azo-bis-isobutyronitrile is added in each case, and the mixture is heated for 2 hours at 70° C.

The copolymers are precipitated with methanol, washed with methanol and dried in a reduced pressure oven for 10 hours at 60° C. and 12 mm Hg. The results obtained are listed in the Table which follows.

| No. | Ethyl acrylate parts | Optically active compound I parts | Conversion % | K value | Proportion of compound I in the copolymer % by weight |
|---|---|---|---|---|---|
| a | 9.0 | 0.1 | 100 | 84 | 0.9 |
| b | 9.5 | 0.5 | 100 | 85 | 4.95 |
| c | 9.0 | 1.0 | 98 | 86 | 9.8 |
| d | 8.5 | 1.5 | 99 | 83 | 14.8 |
| e | 8.0 | 2.0 | 96 | 86 | 19.8 |
| f | 7.0 | 3.0 | 100 | 81 | 29.7 |
| g | 6.0 | 4.0 | 105 | 89 | 39.8 |
| h | 5.0 | 5.0 | 98 | 82 | 49.9 |
| i | 4.0 | 6.0 | 100 | 89 | 60.0 |
| j | 2.5 | 7.5 | 98 | 84 | 74.6 |
| k | 1.0 | 9.0 | 95 | 86 | 90 |

EXAMPLE 2

A solution of 50 parts of toluene, 50 parts of a copolymer of ethyl acrylate and compound IV ($[\alpha]_D^{20} = +35.4°$), manufactured as described in Example 1 c), is prepared, and applied to a substrate.

The finish produced is clear and is insoluble in acetone or toluene.

EXAMPLE 3

6 parts of styrene and 6 parts of compound VI ($[\alpha]_D^{20} = +40.5°$) are polymerized in the presence of 0.1 part of azo-bis-isobutyronitrile for 8 hours at 70° C. The polymer has a K value of 66 and contains 50 percent by weight of copolymerized pinane derivative. The conversion is 94 percent.

EXAMPLE 4

Butadiene is forced in over a solution of 150 parts of toluene, 10 parts of pinane derivative from Example 1 and 1 part of azo-bis-isobutyronitrile until the butadiene pressure in the gas space is 6 atmospheres gauge, whilst stirring the mixture for 8 hours at 90° C. After this reaction time the polymer has a solids content of 27 percent by weight and a K value of 74, and contains 16.5 percent by weight of pinane derivative.

EXAMPLE 5

The procedure described in Example 4 is followed, but the butadiene is replaced by ethylene; with a reaction time of 8 hours, a reaction temperature of 90° C. and an ethylene pressure, in the gas space, of 235 atmospheres gauge, a solution having a solids content of 21 percent by weight is obtained. The K value of the copolymer, which contains about 12 percent by weight of pinane derivative, is 48 (measured on a 1 percent strength solution in decahydronaphthalene).

EXAMPLE 6

A solution of 100 parts of toluene, 10 parts of compound VIII ($[\alpha]_D^{20} = +39.8°$), 270 parts of styrene and 3 parts of azo-bis-isobutyronitrile is heated for 8 hours at 90° C., whilst stirring. 280 parts of a copolymer having a K value of 42 (measured on an 0.5 percent strength solution in toluene) and containing about 3 percent by weight of pinane derivative are obtained.

EXAMPLE 7

6 parts of pinane derivative from Example 1 are polymerized in the presence of 0.01 part of azo-bis-isobutyronitrile for 2 hours at 70° C. 5.5 parts of a homopolymer having a K value of 69 are obtained.

EXAMPLE 8

The procedure described in Example 7 is followed, but the pinane derivative from Example 2 is used as the monomer; 5.5 parts of a homopolymer having a K value of 59 are obtained.

We claim:

1. A polymer, having a K value of from 20 to 140, which contains structural units of the formula

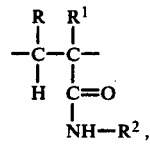

where R is H, COOH or CO—NH—$R^2$, $R^1$ is H or $CH_3$ and $R^2$ is

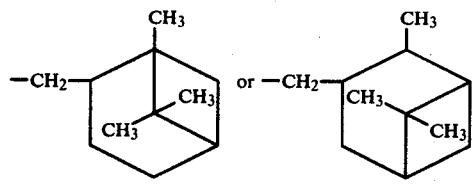

2. A polymer as claimed in claim 1 having a K value of from 50 to 90.

3. A process for the manufacture of a polymer which has a K value of from 20 to 140 and contains 1,6,6-trimethylnorpinanyl-2-methyl or 3-pinanylmethyl groups, which process comprises polymerizing in the presence of an initiator which forms free radicals an olefinically unsaturated compound of the formula

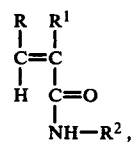

where R is H, COOH or CO—NH—$R^2$, $R^1$ is H or $CH_3$ and $R^2$ is

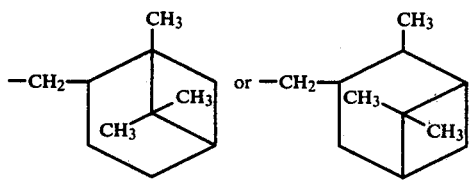

4. A process as claimed in claim 3 wherein said polymerization is carried out at a temperature from 0° to 150° C. and under atmospheric or superatmospheric pressure.

5. A process as claimed in claim 3 or claim 4 wherein said polymerization is carried out in the presence of a solvent or diluent.

6. A process as claimed in claim 3 wherein said polymerization is carried out as a mass polymerization.

7. A process as claimed in claim 3 wherein said polymerization is carried out by copolymerizing said olefinically unsaturated compound with an acrylic acid ester as a comonomer.

8. A process as claimed in claim 7 wherein said copolymerization is carried out in an aromatic or aliphatic hydrocarbon.

* * * * *